(12) United States Patent
Wang

(10) Patent No.: US 7,411,704 B2
(45) Date of Patent: Aug. 12, 2008

(54) MULTIPLE-BACKGROUND DEVICE FOR A SCANNER AND CALIBRATION DEVICE UTILIZING THE SAME PRINCIPLE

(75) Inventor: Bo-Hsiang Wang, Hsinchu (TW)

(73) Assignee: Avision Inc., Hsinchu (TW)

( * ) Notice: Subject to any disclaimer, the term of this patent is extended or adjusted under 35 U.S.C. 154(b) by 527 days.

(21) Appl. No.: 11/085,454

(22) Filed: Mar. 21, 2005

(65) Prior Publication Data

US 2005/0243382 A1 Nov. 3, 2005

(30) Foreign Application Priority Data

Apr. 30, 2004 (TW) .............................. 93206782 U

(51) Int. Cl.
*H04N 1/04* (2006.01)

(52) U.S. Cl. ...................... 358/461; 358/496; 358/408; 358/474

(58) Field of Classification Search ................. 358/461, 358/496, 498, 497, 408, 463, 406, 504, 488, 358/474; 382/274; 399/364, 367, 374; 355/23
See application file for complete search history.

(56) References Cited

U.S. PATENT DOCUMENTS

| | | | | |
|---|---|---|---|---|
| 5,101,284 A | * | 3/1992 | Tanabe | 358/461 |
| 6,839,155 B2 | * | 1/2005 | Spencer | 358/488 |
| 6,891,648 B2 | * | 5/2005 | Inoue et al. | 358/516 |
| 6,947,187 B2 | * | 9/2005 | Mui et al. | 358/496 |
| 7,236,274 B2 | * | 6/2007 | Sheng et al. | 358/504 |
| 2003/0090742 A1 | * | 5/2003 | Fukuda et al. | 358/448 |

* cited by examiner

*Primary Examiner*—Cheukfan Lee
(74) *Attorney, Agent, or Firm*—Charles E. Baxley

(57) ABSTRACT

A multiple-background device for a scanner and a calibration device utilizing the same principle are disclosed. The multiple-background device includes a shaft, a low-reflectance portion and a high-reflectance portion are formed along the length of the shaft. Thereby the shaft can provide various background colors, and the optical module can acquire a plurality of scan lines by means of rotating the shaft for image calibration.

18 Claims, 9 Drawing Sheets

MULTIPLE-BACKGROUND DEVICE FOR A SCANNER AND CALIBRATION DEVICE UTILIZING THE SAME PRINCIPLE

BACKGROUND OF THE INVENTION

1. Field of the Invention

This invention relates to a device for alternating scan backgrounds and for facilitating the shading correction of a scanner. In particular, the device provides more than one background color and is capable to alternate the background colors of the scanner. Such, The device provides an optical module of the scanner with scan lines of different shades to adjust the shade value of the optical module.

2. Description of the Prior Art

Conventionally, a flatbed scanner comprises a mobile optical module which move linearly for scanning. When the scanning is in process, the moving optical module captures optical signals of a plurality of scan lines of an original document. An optical sensor of the optical module then produces a scan image based on the acquired scan information.

For an original document with binder holes or lacerations, black image emerge on its scan image at the positions corresponding to the binder holes or the edges of the scan image if the scanner has a black scan background. To solve this problem, the state of the art utilizes a white scan background.

Another solution for the aforementioned problem is to design a dual scan background including a black scans background and a white scan background. The optical module is driven to move to a position underneath the selected background color and capture image information when the moving original document passes over the optical module. However, since a moveable optical module is required for the transformation of background, this solution is only applicable to a flatbed scanner in combination with a document feeder, as claimed in U.S. Pat. No. 6,166,394. The solution disclosed in said US patent requires the position adjustment of the optical module in accordance with the positions of the background and, thus, makes the positioning of the optical module difficult.

A flatbed scanner is applicable for itself or combines with a sheet feeder with an optical module for duplex scanning. However, for a scanner with dual optical modules, the optical modules of the scanner are fixed during the scanning process. If the optical module position corresponding to different background colors changes when performing shading correction, the angles and distances between the optical modules and the original document will be different from those during the scanning process; in result, the scan image using the correction values is defected. Therefore, to ensure best image quality while implementing the background alternation, the best way is not to move the optical module in order not to altering the optical path of the signals which carry the image information.

In addition, with the conventional device, the fixed optical module is not capable of capturing a plurality of scan lines, so the result of this shading correction is questionable. According to U.S. Pat. No. 6,323,933, the optical module on top of the scanner body is capable of capturing a plurality of scan lines of a calibration sheet on the optical module moving underneath the scanner. However, the said patent does not solve the problem that the distance between the upper and the lower optical modules may be different from the distance between the original document and the upper optical module. As a result, the optical path length may be different in the two circumstances and, thus, the accuracy of the shading correction is affected.

SUMMARY OF THE INVENTION

The primary objective of the present invention is to provide a multiple-background device for a scanner, in particular a device providing background color alternation function to solve the problem of the black image due to holes or lacerations on an original document.

Another objective of the present invention is to provide a shading correction device for a scanner to capture a plurality of scan lines from the multiple-background device for the shading correction of an optical module.

To achieve the aforementioned objectives, a rotating shaft is installed on the scanner of the present invention opposite to the scan window and the optical module of the scanner. The rotating shaft comprises a low reflectivity area and a high reflectivity area. When an alternation of the background colors is required, the rotating shaft is rotated such that the surface area of a selected reflectance is facing the scan window. When a shading correction is required, the rotating shaft only needs to comprise a reflecting area and rotate by one circle so that the optical module can capture a plurality of scan lines for the shading correction.

DETAILED DESCRIPTION OF THE INVENTION

Figure 1:
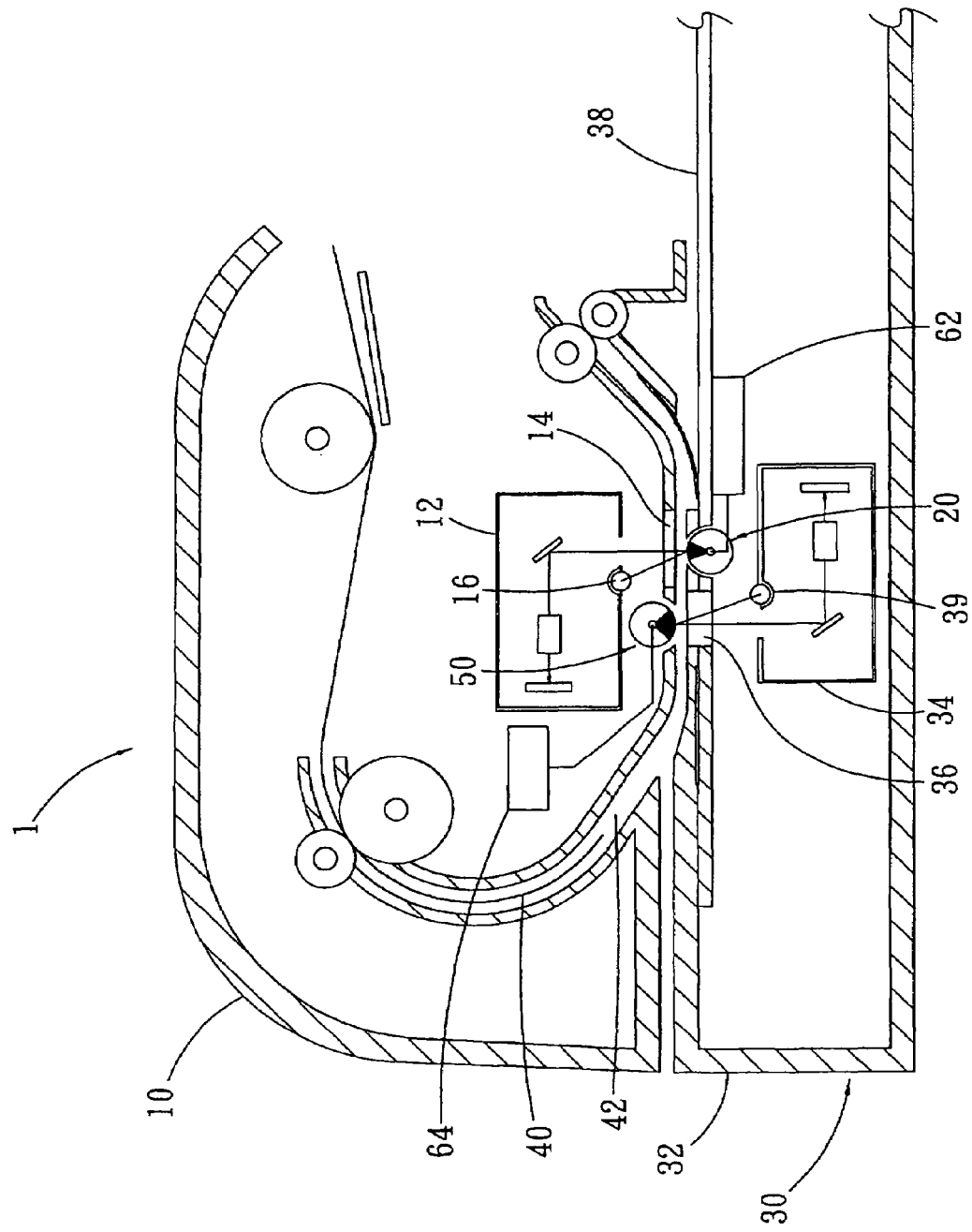
FIG. 1 is a schematic view showing the present invention.
Figure 2:
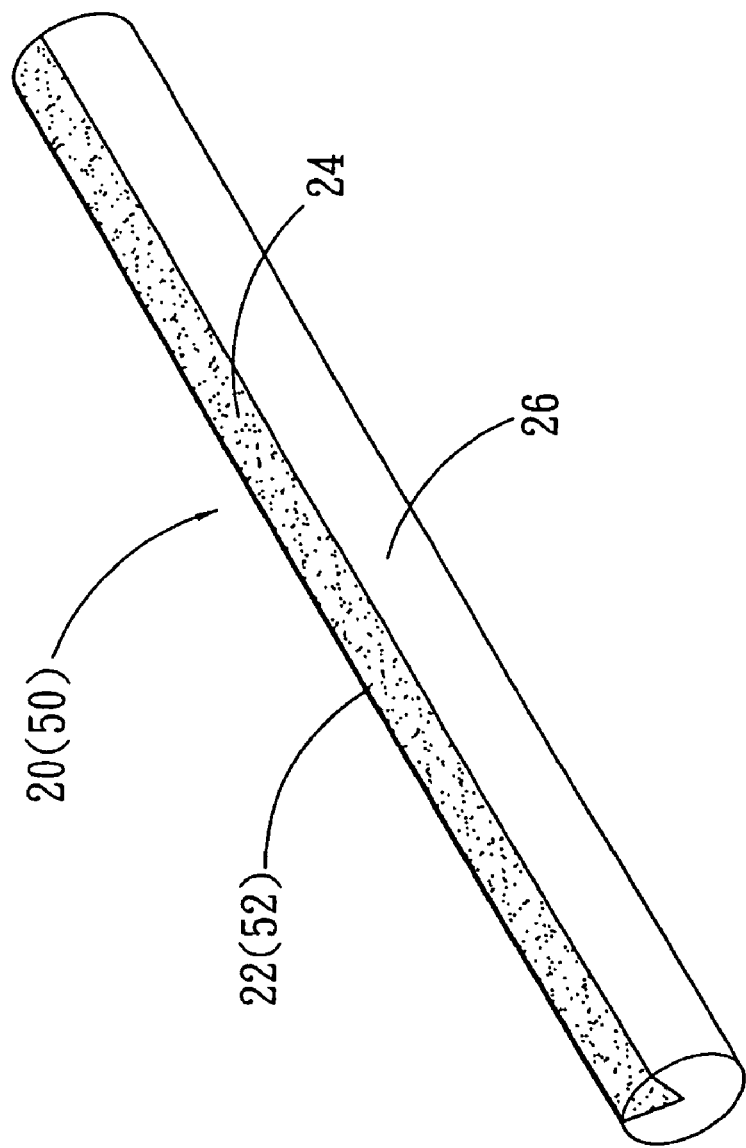
FIG. 2 is an outer view showing a rotating shaft of the multiple-background device of the present invention.

The embodiment in FIG. 1 shows a scanner 1 with document feeding function as a combination of an automatic document feeder 10 and a flatbed scanner 30. The scanner 1 is capable of duplex scanning. The automatic document feeder (ADF) 10 has a fixed optical module 12 that does not move along with scanning movement. The ADF 10 has a scan window 14 on the bottom thereof and the light emitted from a light source 16 can reach to the scan window 14. Two multiple-background devices 20, 50 are disposed in the scanner 1 and opposite to the optical modules 12, 34 respectively. The multiple-background device 20, for example, is disposed in the flatbed scanner 30 and opposite to the scan window 14. As FIG. 2 shows, the multiple-background 20 has a rotating shaft 22, which has a low reflectivity area 24 and a high reflectivity area 26 on the surface thereof. The low reflectivity area 24 may have a black color and high reflectivity area 26 may have a white color. It is important to note that the present invention is not limited to a structure with two reflecting areas on the rotating shaft 22 and more than two reflecting areas are allowable if required. The surface area of the low reflectivity area 24 can be set smaller than the surface area of the high reflectivity area 26.

Figure 3:
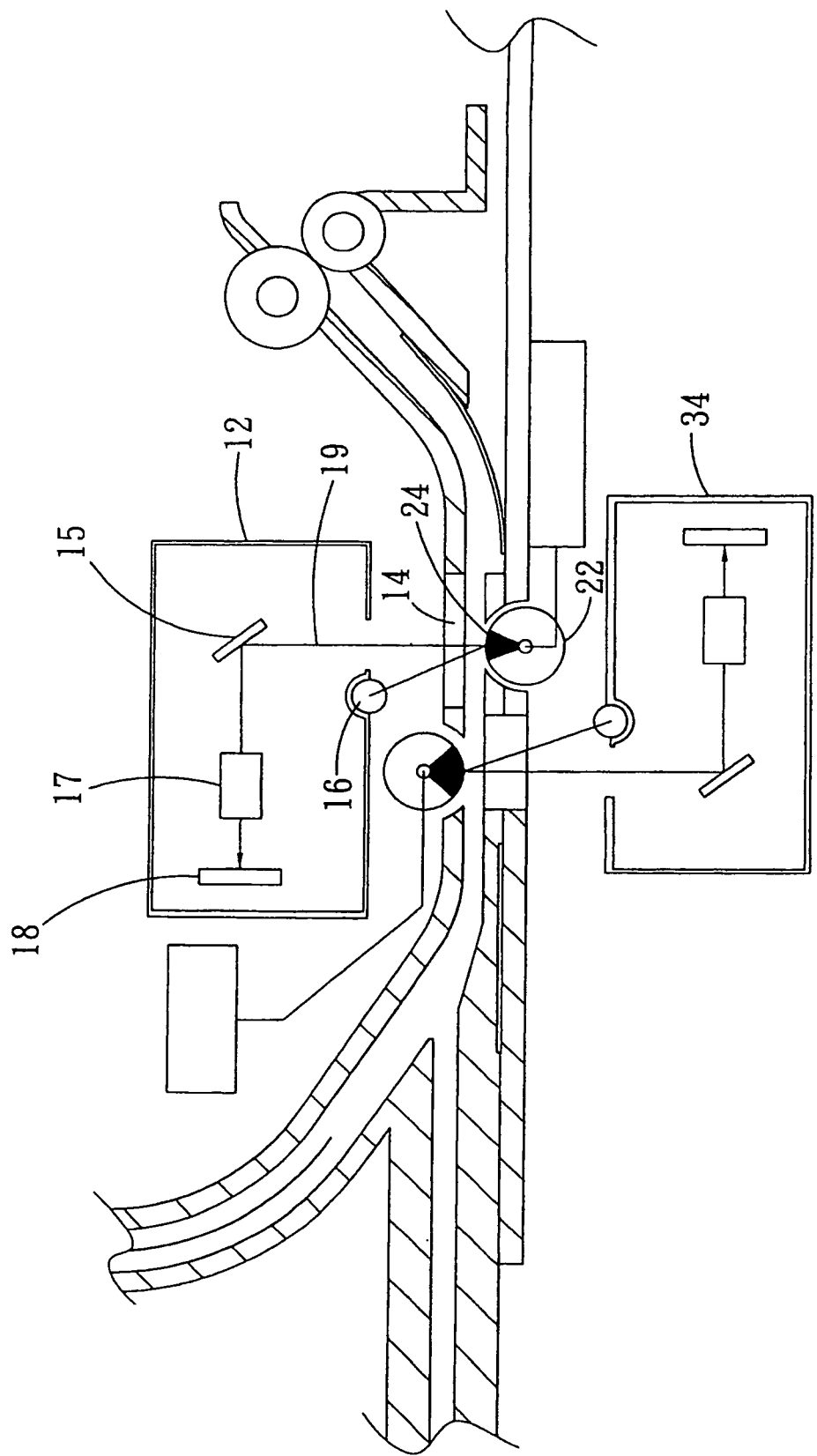
FIG. 3 is a schematic view showing a usage of the dark background color of the present invention.

As shown in FIG. 3, the optical module 12, for example, has a light source 16, a reflecting mirror 15, a lens 17, and an optical sensor 18. The light source 16 provides light required for scanning, while the reflecting mirror 15 is used to reflect an optical signal 19. The lens 17 and optical sensor 18 are assembled on the optical path of the optical signal 19, so that the optical signal 19 is reflected by the reflecting mirror 17 and focused by the lens 17, and used for producing images when received by the optical sensor 18. The optical sensor 18 is either a charge coupled device (CCD) or a contact image sensor (CIS). The other optical module 34 may have the same components and configuration as the optical module 12.

As FIG. 1 shows, the rotating shaft 22 is driven by a power source 62, which can be either a stepper motor or a servomotor. The power source 62 is also applicable as a power source for the optical module 34. A solenoid valve can be used as the power source as well to drive the rotating shaft 22 to do reciprocating motions at a specific angle to provide different scanning backgrounds for the optical module 12.

The flatbed scanner 30 has a housing 32 and an optical module 34 capable of doing reciprocating motions. A small scan window 36 and a large scan window 38 are disposed on the surface of the housing 32. When the flatbed scanner 30 and the ADF 10 are combined, the optical module 34 is fixed to a scanning position and the light emitted from the light source 39 reaches to the small scan window 36. The multiple-background device 50 disposed in the ADF 10 is located opposite to the optical module 34. The multiple-background device 50 operates under the same principle as the multiple-background 20, except that the power source which drives the roller set of the ADF 10 is also applicable as the power source 64 for the multiple-background device 50.

For the multiple-background device 20, for example, when the high reflectivity area 26 on the surface of the rotating shaft 22 is facing the scan window 14 and an original document 40 passes through the feeding path 42 of the scanner 1, the background of the document 40 displays a light color.

As FIG. 3, when a dark background is required, the user may use controls (such as control keys or programmable options of the software used) to rotate the rotating shaft 22 so that the low reflectivity area 24 is facing the scan window 14. The background color can be changed under the same principle when a light background is required.

Figure 4:
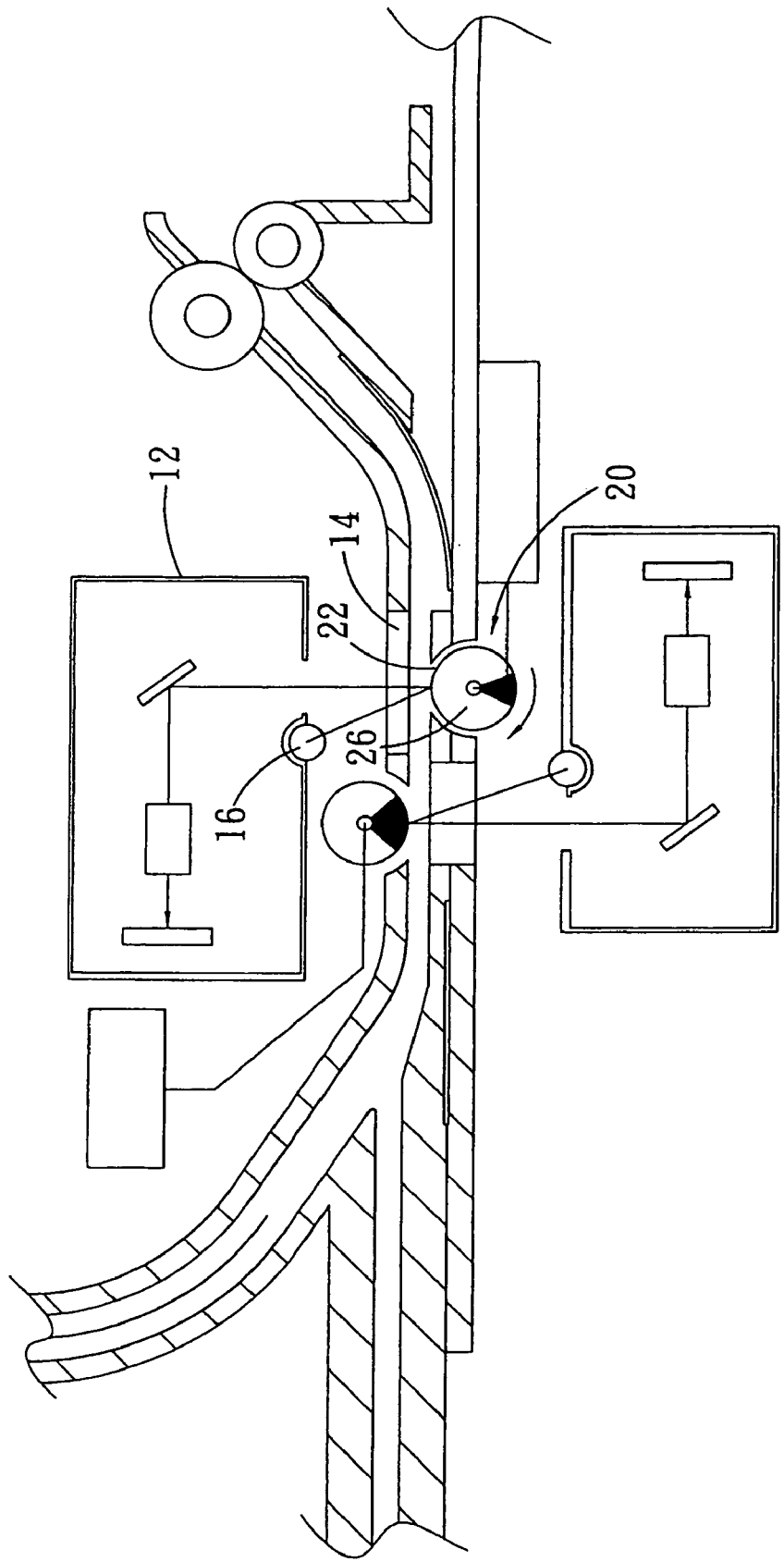
FIG. 4 is a schematic view showing a usage of the light background color of the present invention.
Figure 5:
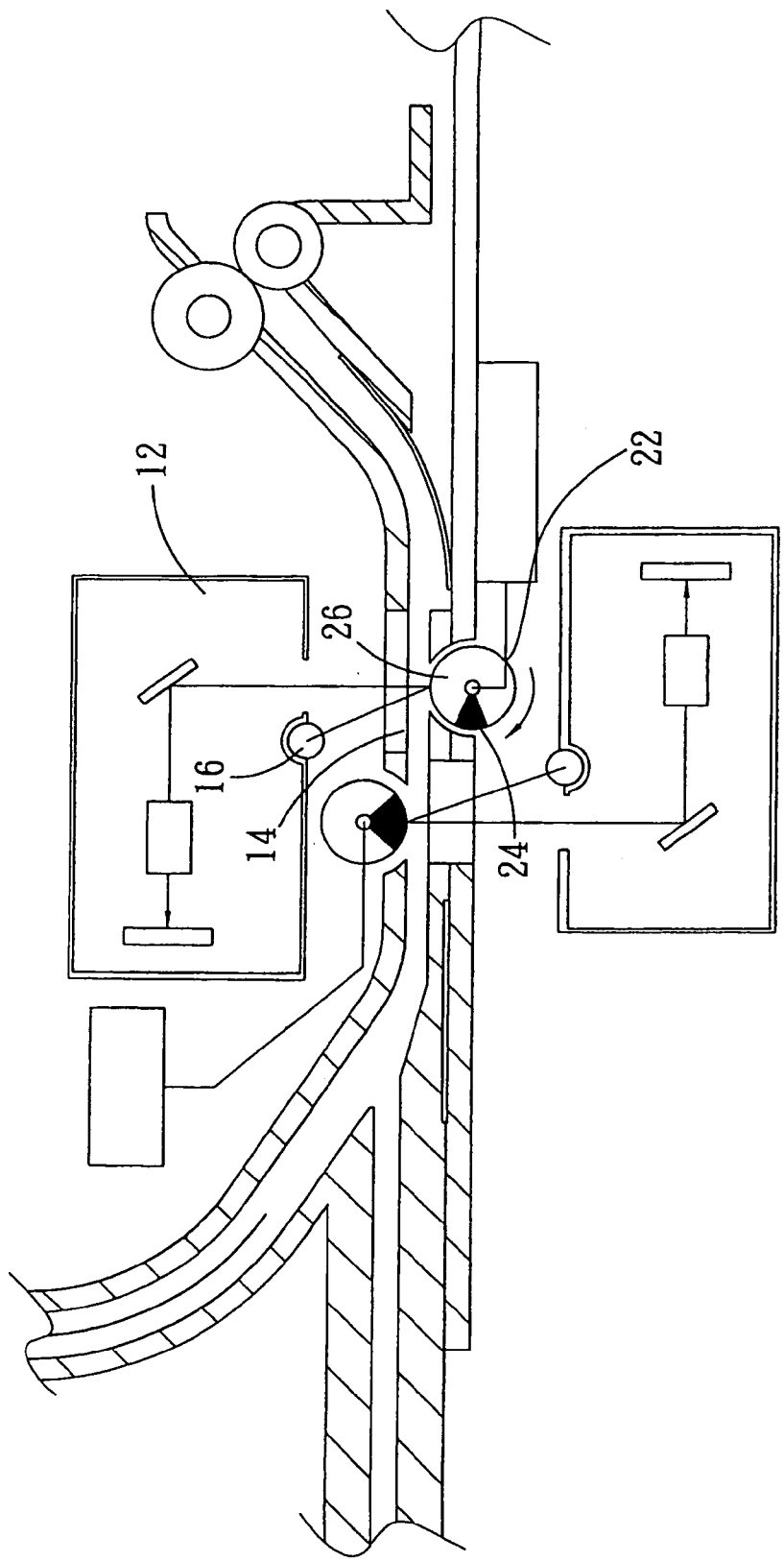
FIG. 5 is a schematic view showing a usage of the present invention for the shading correction.

In addition to providing different background colors, the multiple-background device 20 is applicable as a shading correction device. The shading correction of prior art is carried out by moving an optical module and having a light source illuminating a white calibration strip to capture scan lines. As FIG. 4 shows, the high reflectivity area 26 is facing the light source 16 by having the rotating shaft 22 of the present invention rotate so that the light source 16 illuminates the high reflectivity area 26. As FIG. 5 shows, the light source 16 illuminates different locations of the high reflectivity area 26 when the rotating shaft 22 is rotating. The rotating shaft 22 stops rotating when the low reflectivity area 24 on the rotating shaft 22 is facing the scan window 14. In doing so, the optical module 12 captures a plurality of scan lines from the high reflectivity area 26 and uses the scan lines for the shading.

Figure 6:
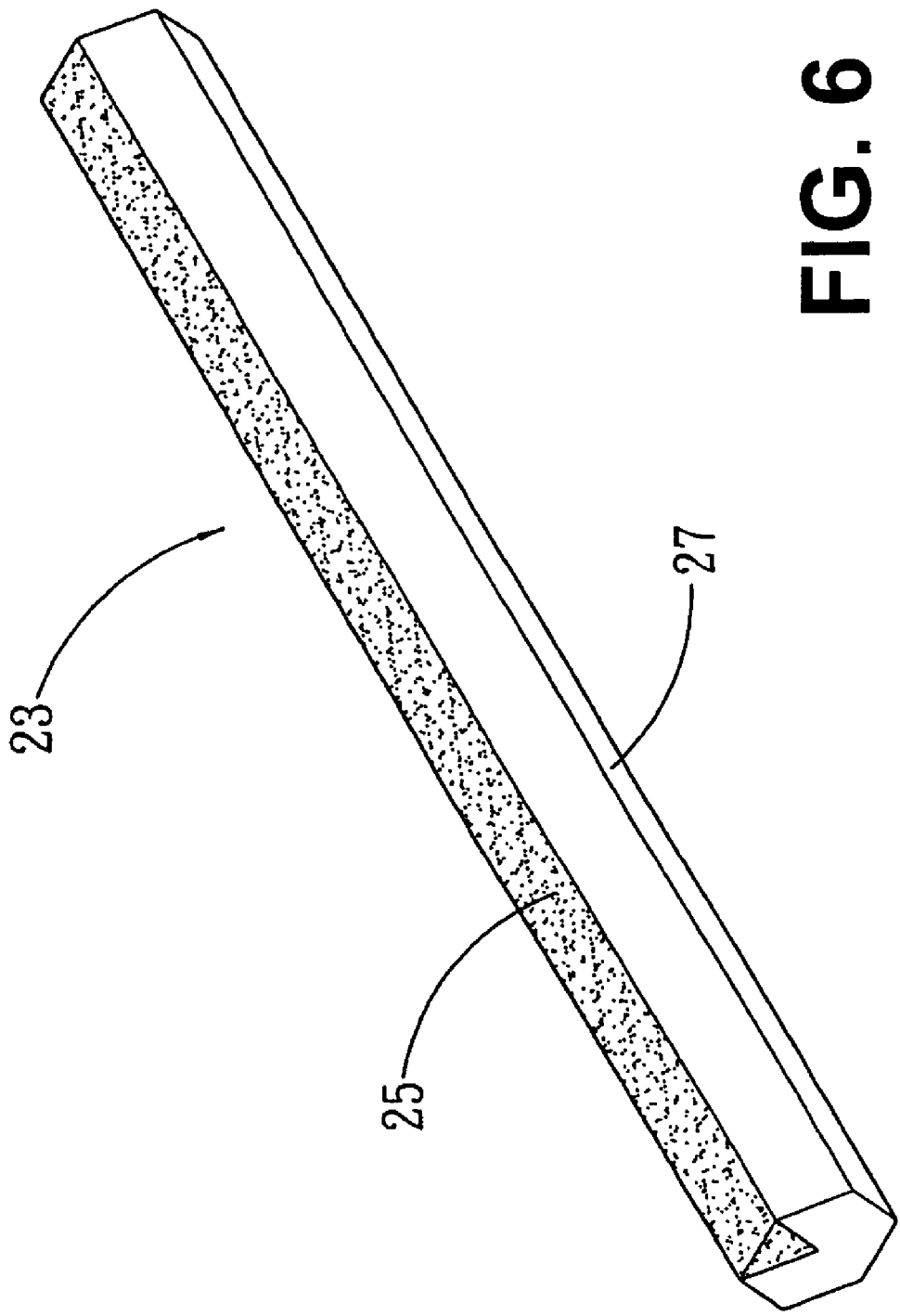
FIG. 6 is a schematic view showing another structure of the multiple-background device of the present invention.

In the aforementioned embodiment, the rotating shafts 22, 52 of the multiple-background devices 20, 50 are cylindrically shaped as shown in FIG. 2. Another embodiment in FIG. 6 has a prism as the rotating shaft 23. A surface area of the prism is designed as a low reflectivity area 25, while the rest of the surface areas of the prism are designed as a low reflectivity area 27. More reflecting areas with different colors are allowed by making use of the multiple surface areas of the prism.

Figure 7:
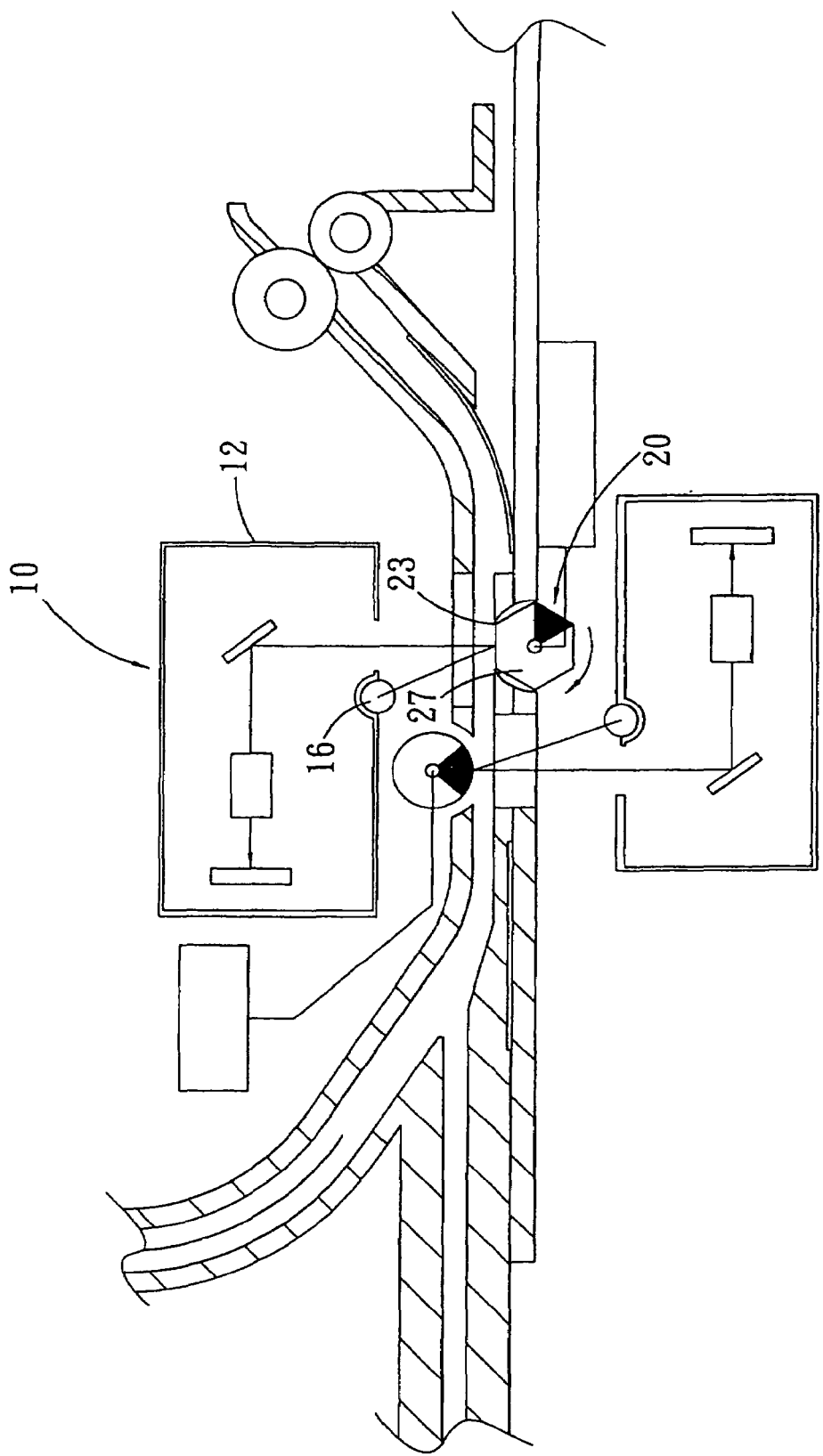
FIG. 7 is a schematic view showing a usage of the multiple-background device of the present invention with another structure.

For the multiple-background device 20 opposite to the optical module 12, for example as illustrated in FIG. 7, the rotating shaft 23 is operated and driven under the same principle as the aforementioned embodiment of the present invention. When the rotating shaft 23 is installed at the same position as the rotating shaft 22 in FIG. 5 and driven by a power source, the scan background is alternated accordingly. When the rotating shaft 23 is used as a shading correction device for the optical module 12, the rotating shaft 23 rotates to allow the high reflectivity area 27 facing the light source 16 in order for the optical module 12 to capture a plurality of scan lines for the shading correction. A cross-section of the rotating shaft 23 in FIGS. 6 and 7 shaped as a polygon will be sufficient for the present invention.

Figure 8:
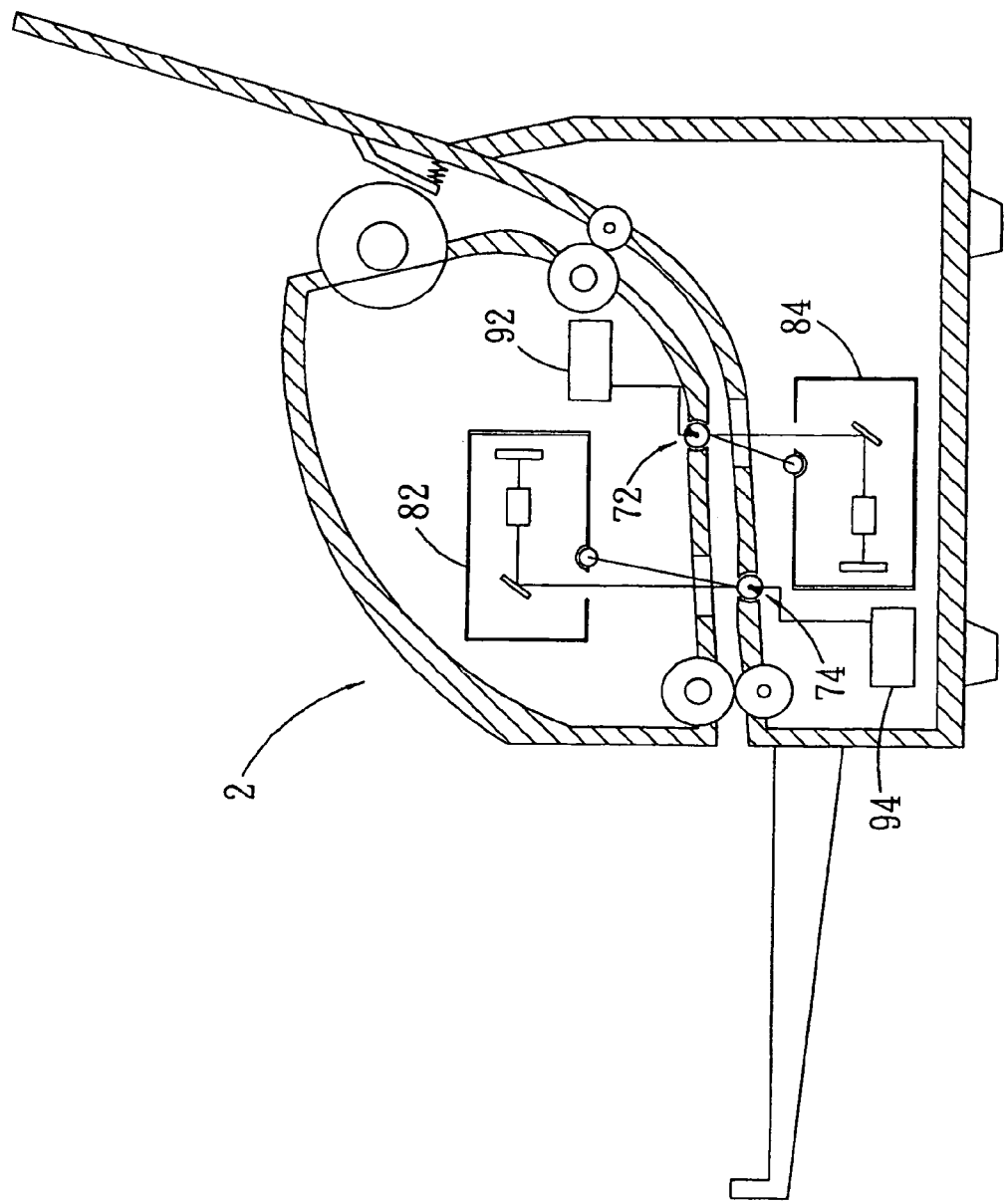
FIG. 8 is a schematic view showing an application of the present invention on a sheet fed scanner.

FIG. 8 shows the application of the present invention on a sheet fed scanner 2. The sheet fed scanner 2 has a duplex scanning function and comprises an upper optical module 82 and a lower optical module 84 and corresponding optical modules 82 and 84. The multiple-background device 72 is located opposite to the optical module 84, while the other multiple-background device 74 is opposite to the optical module 82. The sheet fed scanner 2 has two power sources 92 and 94 to drive the multiple-background devices 72 and 74, respectively, under the same principle as the aforementioned embodiments. The power source 92 or 94 is applicable as the power source of the feeding roller. Since the optical modules of the sheet fed scanner are fixed, the design of the present invention can effectively solve the problems of background alternation and shading correction that prior art sheet fed scanners have encountered.

The rotating shaft of the present invention has multiple background colors on the surface thereon and, thus, is capable of changing background colors for scanning. The rotating shaft rotates in a manner of relative motion to the light source and allows the optical module to capture a plurality of scan lines for the shading correction. It is important to note that different background colors result in different amount of light received by the image sensor so that the scan background information transmitted to the optical module is different.

Figure 9:
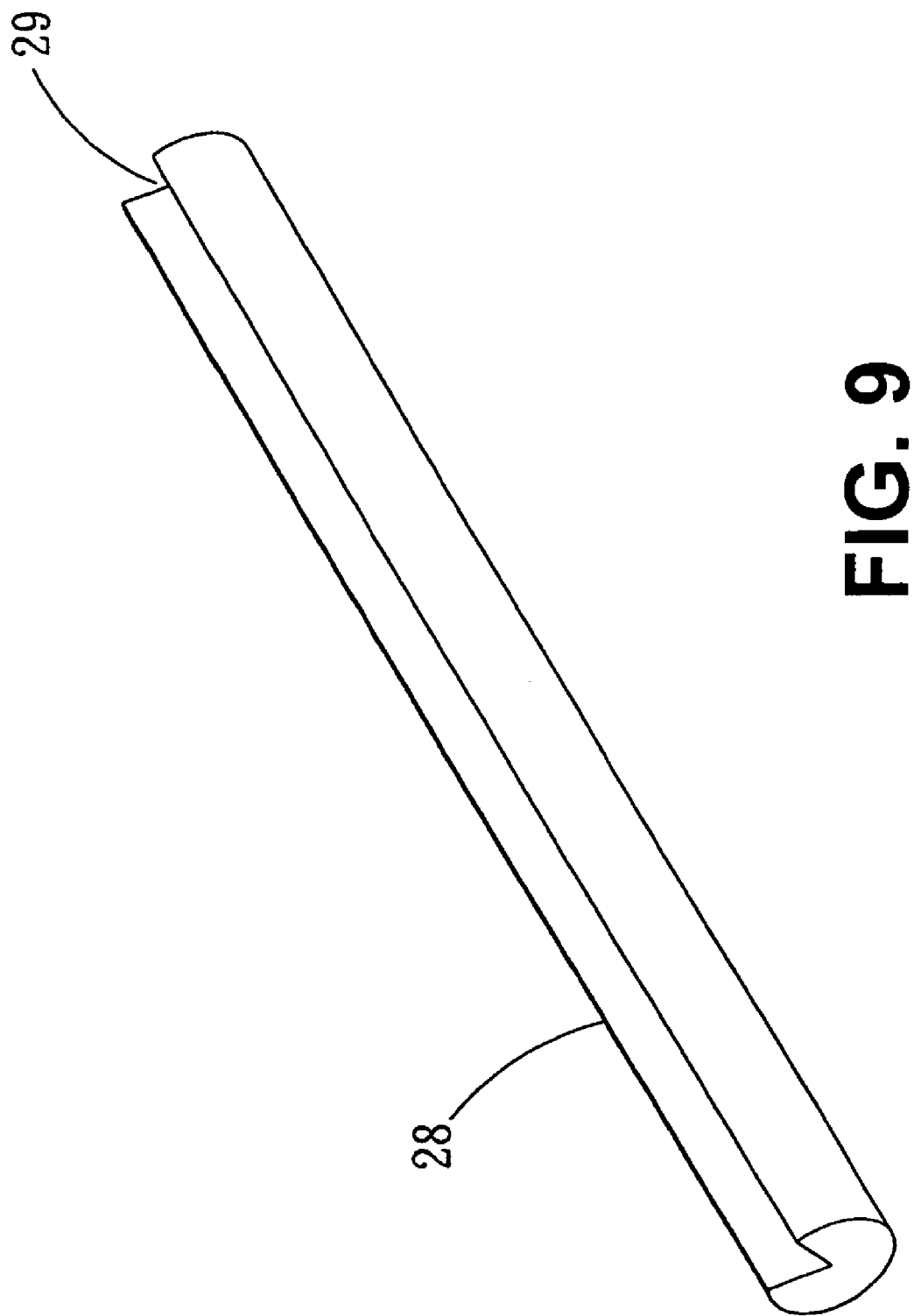
FIG. 9 is an outer view showing another rotating shaft of the multiple-background device of the present invention.

In other words, the present invention is designed to display the scan background color by mapping the light and optical signal received by the optical module. As FIG. 9 shows, a trough 29 is axially formed on the rotating shaft 28. As the light source illuminates the trough 29, where an area equivalent to a dark surface is formed, less amount of the light reaches the optical module than when the light source illuminates the area with the trough 29. Paints of different colors, papers of different colors, or materials of different reflectivities for the reflecting areas on the rotating shaft could achieve the objective of the present invention. In other words, rotating shafts comprising reflecting areas of various reflection coefficients are applicable to the present invention.

The aforementioned embodiments are applicable to the dual optical module of a combination of an automatic document feeder and a flatbed scanner, a dual optical module of the sheet fed scanner 2, and, especially, to a scanner having only one single optical module. Use of the present invention does not affect the background transformation functionality and shading correction accuracy of the multiple-background device.

The rotating shafts in the aforementioned embodiments can merely contain a single standard color of a single light reflection coefficient for the shading correction. In other words, if the rotating shaft of the present invention has only a surface area of one light reflection coefficient, it can be used for the shading correction. If the rotating shaft has more than two reflecting areas of various reflection coefficients, it can be used for backgrounds alternation and selectively provides the shading correction functions.

Although this invention has been disclosed and illustrated with reference to particular embodiments, the principles involved are susceptible for use in numerous other embodiments that will be apparent to persons skilled in the art. This invention is, there, to be limited only as indicated by the scope of the appended claim.

What is claimed is:

1. A multiple-background device for a scanner to provide an optical module with multiple scan backgrounds, comprising:
    a rotating shaft rotatably disposed on a position opposite to said optical module, having:
    a low reflectivity area formed axially on a surface of said rotating shaft;
    a high reflectivity area formed axially on a surface of said rotating shaft and adjacent to said low reflectivity area; and
    a power source driving said rotating shaft so that said low reflectivity area and said high reflectivity area are selectively facing said optical module;
    wherein said rotating shaft is a prism.

2. The multiple-background device for a scanner of claim 1, wherein said low reflectivity area is black.

3. The multiple-background device for a scanner of claim 1, wherein said high reflectivity area is white.

4. The multiple-background device for a scanner of claim 1, wherein said low reflectivity area and said high reflectivity area are formed with color sheets of different light reflection coefficients.

5. The multiple-background device for a scanner of claim 1, wherein said low reflectivity area and said high reflectivity area are formed with paints of different light reflection coefficients.

6. The multiple-background device for a scanner of claim 1, wherein said low reflectivity area and said high reflectivity area are formed with materials of different light reflection coefficients.

7. The multiple-background device for a scanner of claim 1, wherein the power source is a motor.

8. The multiple-background device for a scanner of claim 7, wherein said rotating shaft rotates relatively to said optical module, allowing said optical module to capture a plurality of scan lines therefrom for shading correction.

9. The multiple-background device for a scanner of claim 1, wherein said power source drives a document feeder installed on said scanner.

10. The multiple-background device for a scanner of claim 1, wherein said power source drives said optical module.

11. The multiple-background device for a scanner of claim 1, wherein said power source is a solenoid valve.

12. A multiple-background device for a scanner to provide an optical module with multiple scan backgrounds, comprising:
    a rotating shaft rotatably disposed on a position opposite to said optical module, having:
    a low reflectivity area formed axially on a surface of said rotating shaft;
    a high reflectivity area formed axially on a surface of said rotating shaft and adjacent to said low reflectivity area; and
    a power source driving said rotating shaft so that said low reflectivity area and said high reflectivity area are selectively facing said optical module;
    wherein said low reflectivity area is a trough formed axially along said rotating shaft.

13. The multiple-background device for a scanner of claim 12, wherein said rotating shaft is a cylinder.

14. The multiple-background device for a scanner of claim 12, wherein said rotating shaft is a prism.

15. A calibration device for a scanner for shading correction of an optical module, comprising:
    a rotating shaft rotatably disposed on a position opposite to said optical module and having a surface area of a specific light reflection coefficient; and
    a power source driving said rotating shaft to rotate relatively to said optical module, allowing said optical module to capture a plurality of scan lines therefrom for shading correction;
    wherein said rotating shaft is a prism.

16. The calibration device for a scanner of claim 15, wherein the power source is a motor.

17. The calibration device for a scanner of claim 15, wherein said power source drives a document feeder installed on said scanner.

18. The calibration device for a scanner of claim 15, wherein said power source drives said optical module.

* * * * *